May 23, 1967     H. L. JOHNSON ETAL     3,321,054
TRANSMISSION LOCK
Filed Feb. 3, 1965
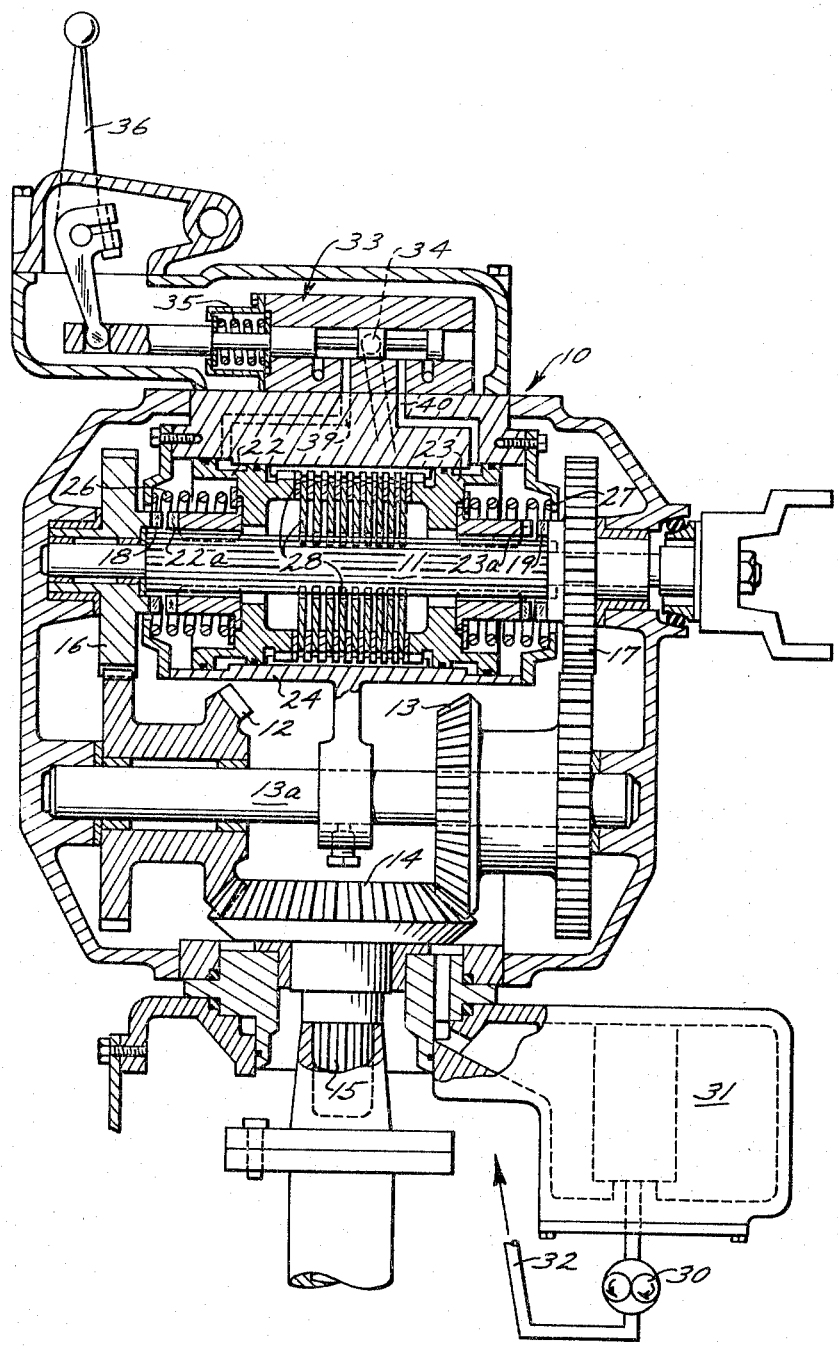
INVENTORS
HOWARD L. JOHNSON
FRANK H. WINTERS
BY
ATTORNEYS

United States Patent Office 3,321,054
Patented May 23, 1967

3,321,054
TRANSMISSION LOCK
Howard L. Johnson and Frank H. Winters, Joliet, Ill., assignors to Caterpillar Tractor Co., Peoria, Ill., a corporation of California
Filed Feb. 3, 1965, Ser. No. 430,064
3 Claims. (Cl. 192—4)

ABSTRACT OF THE DISCLOSURE

A forward reverse transmission of the kind employed for adjusting the components of a motor grader having a fluid actuated shift mechanism which includes a brake and in which the shifting mechanism and brake are all contained in a single cylinder.

This invention relates to transmissions of the forward-reverse type employed for adjusting movable machine components and particularly to means operable automatically to lock the driven shaft of a transmission against rotation except when adjustment is being made.

In some earthmoving machines, controls are powered from a power takeoff shaft of an engine which serves to drive the machine. For example in motor graders, the raising, lowering, revolving and tilting of the cutting blade as well as other adjustments such as the leaning of the front wheels are made through rotatable shafts adapted to be connected with a power shaft driven by the engine through positive drive dog clutches. Engagement and disengagement of these clutch is accomplished manually through appropriate shifting levers and in some cases, hydraulic means are employed as boosters between the manual lever and the transmission.

Locking couplings sometimes referred to as anti-creep brakes of various types have been employed to prevent forces encountered by the adjusted component from being exerted back through the transmission with the result that the adjusted position of the component is lost and in some cases, the transmission is damaged. Such locks or brakes are normally engaged and automatically disengaged upon shifting of the transmission into either its forward or reverse drive position.

It is the object of the present invention to provide an improved locking coupling or anti-creep brake capable of withstanding very heavy loads and operable automatically by the same hydraulic pressure that is used for shifting the transmission.

Further and more specific objects and advantages of the invention are made apparent in the following specification wherein reference is made to the accompanying drawing.

The drawing is a central vertical sectional view through a transmission and control valve, therefor, and illustrating the locking coupling of the present invention.

The transmission disclosed in the drawing is of a known type described in our assignee's United States patent to Andrew V. Hampton and Carlisle S. Morris No. 3,165,181. The transmission is contained in a housing, generally indicated at 10, within which is mounted a driven shaft 11 extending outwardly through one side of the housing where, in practice, it is connected with some part to be controlled. Such part, for example, may be a motor grader scraper blade or other control member on a road grading machine. Mechanism, not shown, is employed for raising or otherwise adjusting the blade upon rotation of the shaft 11 in one direction and reversing the adjusting operation upon rotation of the shaft in the opposite direction. Rotary movement is imparted to the output shaft 11 through either one of a pair of bevel gears 12 and 13 freely rotatable on a counter shaft 13a driven by a bevel gear 14. The gear 14 is carried on a shaft 15 connected through mechanism not shown, with a suitable power takeoff shaft of the main engine of the road grading machine.

The bevel gears 12 and 13 being thus driven in opposite directions, connection of either one or the other with the driven shaft 11 is effective to impart rotary motion thereto selectively in opposite directions. Each of the gears 12 and 13 drives a gear 16 and 17 respectively and these gears are provided with toothed clutch faces 18 and 19 respectively. A pair of pistons 22 and 23 are slidable axially of shaft 11 in a cylindrical housing 24 which surrounds the shaft and they carry toothed faces 22a and 23a for engagement with the clutch faces 18 and 19 of the gears 16 and 17. Springs 26 and 27 normally urge the clutch pistons 22 and 23 away from the position of clutch engagement and into a brake engaging position where the pistons compress a stack of brake discs shown at 28 splined alternately to the shaft and the cylinder 24.

Consequently, upon adjustment of either of the pistons toward clutch engagement it is first moved away from the brake, which holds the driven shaft 11 against rotation to enable ease of clutch engagement, and the immediately effects engagement of the clutch teeth. The pistons at 22 and 23 are fluid actuated as by hydraulic fluid under pressure from a pump 30 withdrawing fluid from a reservoir 31 and directing it through a line 32 to a spool valve shown at 33 above the housing and having an inlet 34 normally closed by the spool as in the position illustrated. The valve is spring centered as by a spring 35 and manually actuated by a lever 36 to direct fluid selectively through passages 39 or 40 to a chamber in either one of the pistons 22 or 23 for effecting clutch engagement preceded by brake release in the manner just described.

We claim:
1. A forward reverse transmission comprising an output shaft, two gears coaxial with and rotatable in opposite directions relative to the output shaft, means to rotate the gears, a clutch face on each gear, an opposed clutch face element slidable on the shaft and splined thereto between the gears for cooperation with the clutch faces on the gears to drive the shaft, a nonrotatable cylinder surrounding the shaft, a piston in the cylinder for engaging each of the clutch face elements to effect clutch engagement, and means to direct fluid under pressure selectively to said pistons.

2. The combination of claim 1 with resilient means within the nonrotatable cylinder urging the pistons away from clutch engaging positions and toward each other.

3. The combination of claim 2 with a disc type brake between the pistons having discs splined alternately to the shaft and cylinder to provide braking action between the shaft and cylinder upon engagement of said pistons under influence of said resilient means.

References Cited by the Examiner
UNITED STATES PATENTS
984,426  2/1911  Hannifin _____ 192—87.11

FOREIGN PATENTS
525,124  8/1940  Great Britain.

ROBERT M. WALKER, *Primary Examiner.*
DAVID J. WILLIAMOWSKY, *Examiner.*
H. S. LAYTON, *Assistant Examiner.*